Patented Nov. 13, 1923.

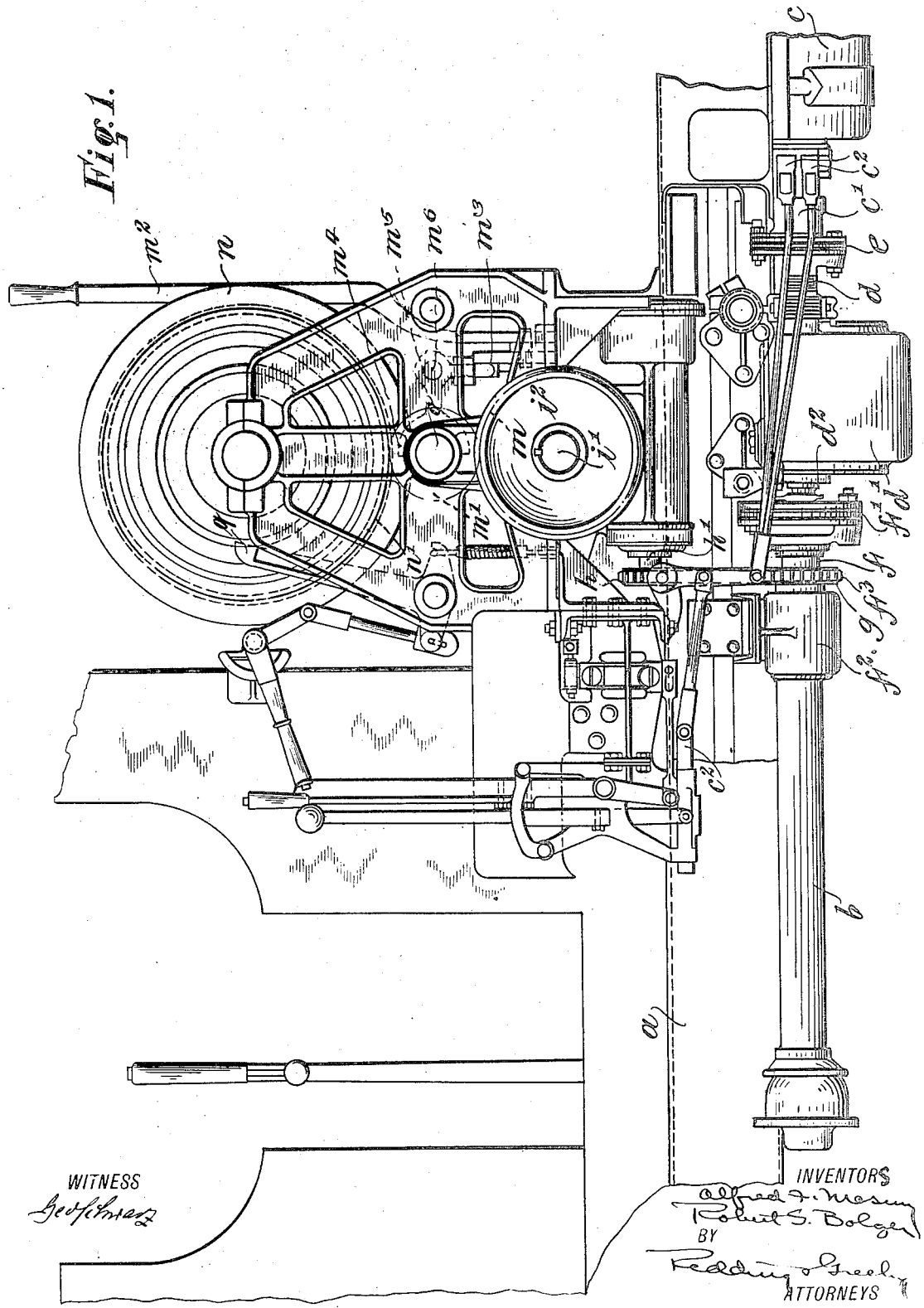

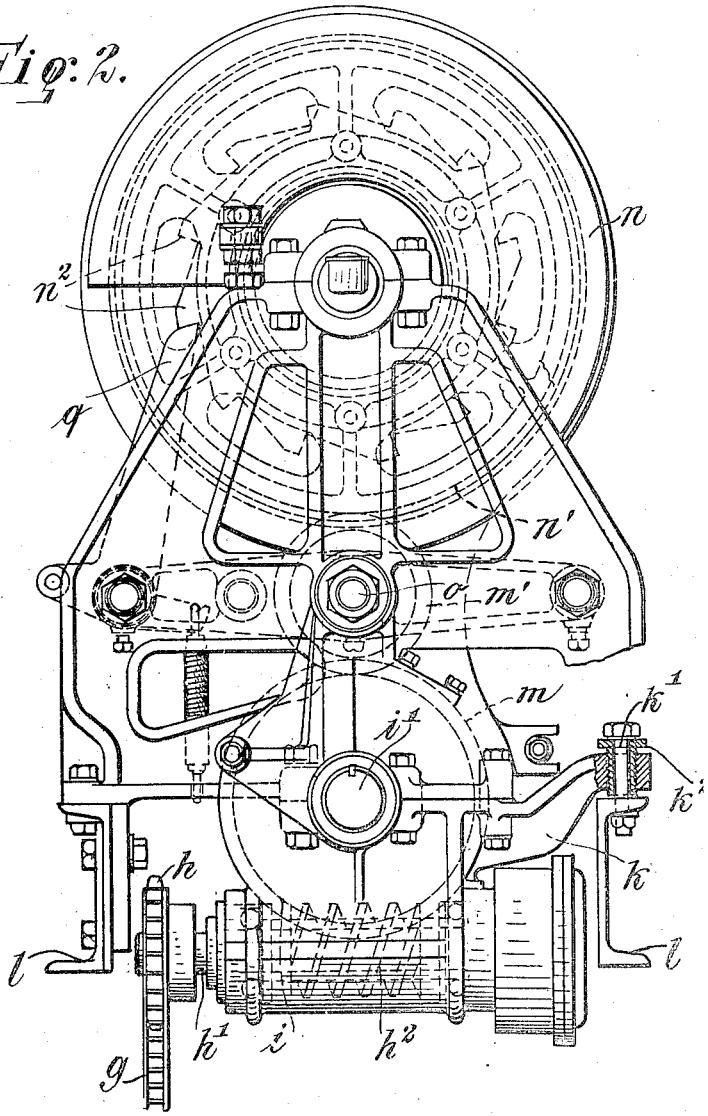

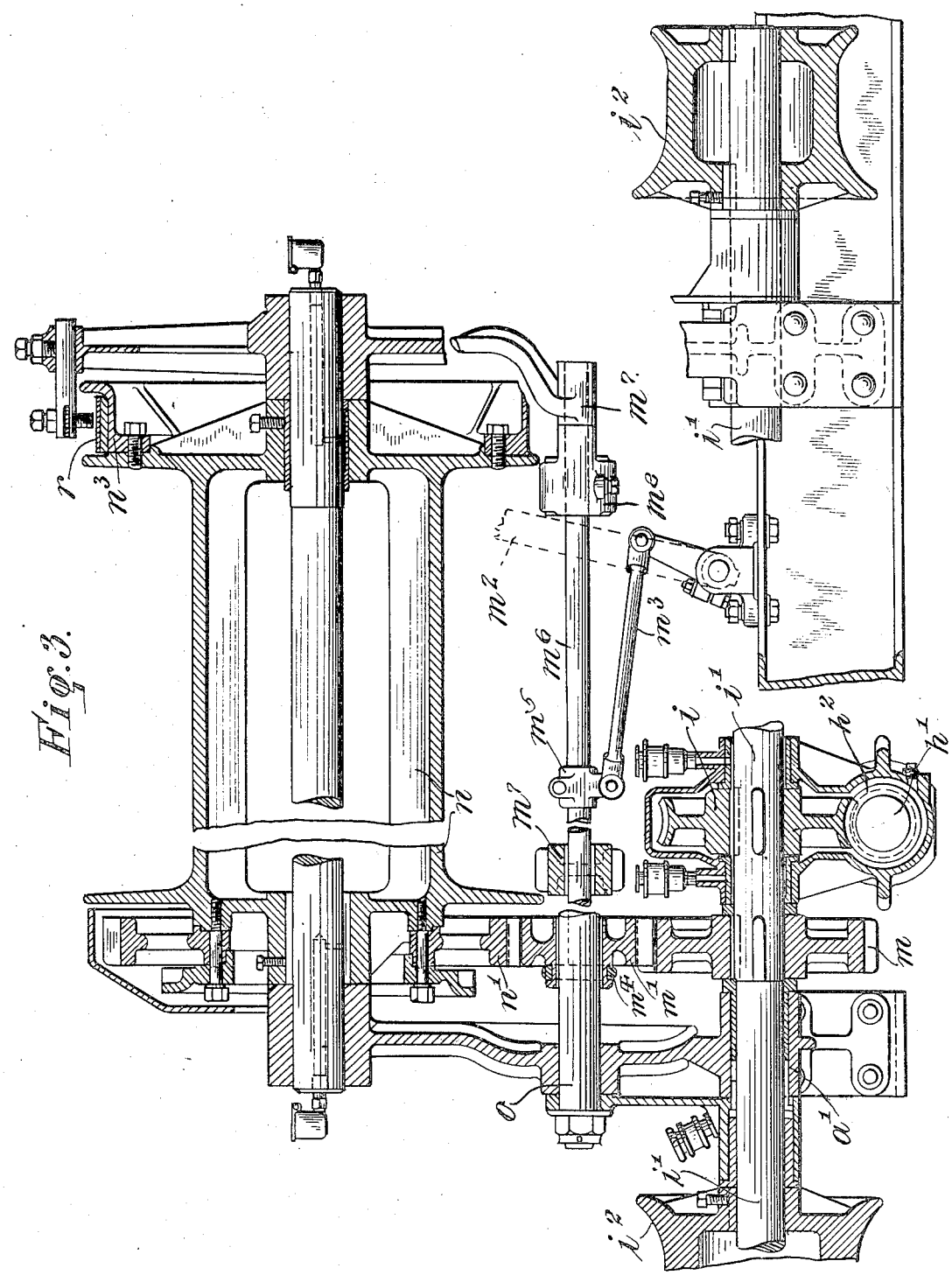

1,474,054

UNITED STATES PATENT OFFICE.

ALFRED F. MASURY AND ROBERT S. BOLGER, OF NEW YORK, N. Y., ASSIGNORS TO INTERNATIONAL MOTOR COMPANY, OF NEW YORK, N. Y., A CORPORATION OF DELAWARE.

VARIABLE-SPEED WINCH FOR MOTOR TRUCKS.

Application filed August 10, 1920. Serial No. 402,582.

*To all whom it may concern:*

Be it known that we, ALFRED F. MASURY and ROBERT S. BOLGER, citizens of the United States, residing, respectively, in the borough of Manhattan and the borough of Queens, of the city of New York, in the State of New York, have invented certain new and useful Improvements in Variable-Speed Winches for Motor Trucks, of which the following is a specification, reference being had to the accompanying drawings, forming a part hereof.

This invention relates to a variable speed winch particularly adapted for use on motor trucks in connection with work with telegraph and telephone cables, winches on motor trucks being now generally employed for pulling the cables through conduits. Heretofore, it has been the usual practise to connect a cable winch on a motor truck operatively with the counter-shaft of the transmission of the vehicle, the winch being driven always at a speed bearing a constant ratio to the speed of the countershaft. The principal object of the present invention is to provide in a structure of the character described variable speed devices between the winch and the propeller shaft whereby the winch can be driven selectively at different speeds and under different power ratios. A further object is to associate with such variable speed means a reverse speed for permitting the winch to be operated at a constant predetermined speed in a reverse direction, the load being carried on the propeller shaft rather than on a brake drum. More particularly, the invention resides generally in the combination with the counter-shaft of the vehicle transmission of a change-speed transmission between said counter-shaft and the drum of a winch.

A further object of the invention is to provide a drive shaft for the winch which shall be journaled in bearings independent of the bearings of the shafts in the said change-speed transmission. This drive shaft is connected through a flexible joint with the drive shaft of said change-speed transmission and is journaled at its free end in a bearing which is beyond the driving connection between said shaft and the winch.

Still another object of the invention is to support the driving worm and worm gear of a motor winch through a loose suspension on the truck frame with provision for relative movement between the frame and said parts whereby the binding of the worm with the worm gear is eliminated under all conditions of distortion and weaving.

Details of the preferred embodiment of the invention will appear more clearly from the following description given with reference to the accompanying drawings in which—

Figure 1 is a view in side elevation of so much of the improved winch and a motor truck as is necessary for an understanding of the combination of parts; the front of the truck is at the right of this figure.

Figure 2 is a view on an enlarged scale and in side elevation of the winch shown in Figure 1.

Figure 3 is a detail sectional view through the improved winch taken at right angles to the views of Figures 1 and 2.

One of the side frame members of the chassis of a motor truck is indicated at $a$; the engine shaft at $b$ and the change-speed transmission box for the vehicle at $c$. It is unnecessary for an understanding of the present improvements to show or describe any of these usual parts of a vehicle in great detail since the invention is not limited to their particular form, it being understood that the vehicle will be propelled by some such shaft as $b$ and its speeds controlled by a suitable transmission such as $c$. A convenient way of taking off power from the vehicle transmission $c$ is by extending the counter-shaft indicated at $c'$ through the wall of the transmission.

This counter-shaft may carry a nigger-head or its equivalent for any purpose desired. Shifting means for the transmission $c$ are shown conventionally at $c^2$. In accordance with the present improvements the counter shaft $c'$ is connected operatively through a drive shaft $d$ to a change-speed transmission set indicated conventionally at $d'$. The invention is not limited to the form of this change-speed transmission although it will, of course, include at least two forward speeds with means for changing them selectively and will, in the preferred embodiment, also include a reverse speed. It is desirable in eliminating undue strains on any of the parts associated with the transmission $c$ and with the transmission $d'$ to connect the shafts $c'$ $d$ through a flexible coupling indicated as a flexible joint $e$. The driven shaft of the transmission $d'$ is indicated at $d^2$. The driving shaft for the winch which derives its power from the shaft $d^2$ is indicated at $f$. The shaft $f$ is preferably connected to the shaft $d^2$ through a flexible coupling in order that no strain will be imposed on any part of the transmission $d'$ and such a coupling is illustrated as a flexible joint $f'$. The free end of the shaft $f$ is journaled in a bearing $f^2$. The power from the shaft $f$ is taken off intermediate its ends through a transmission element such as a sprocket $f^3$ over which runs a drive chain $g$ engaged with a driven sprocket $h$ on a worm shaft $h'$. By connecting the shaft $f$ flexibly with the power shaft $d^2$ and providing an end bearing $f^2$ beyond the transmission element $f^3$ it will be readily seen that none of the lateral driving stresses on the shaft are imposed on the transmission $d'$ and that the shaft is supported substantially and yet flexibly so as to be under a minimum strain itself.

The worm shaft $h'$ is engaged through the worm $h^2$ with a worm gear $i$ carried on a shaft $i'$ which extends transversely of the chassis and may carry on its ends nigger-heads $i^2$ for certain classes of work. As shown best in Figure 2 the carrying frame $k$ for the shaft $i'$ is supported on transverse channel pieces $l$ carried on the chassis of the vehicle. One side of this frame member is secured to the channel piece $l$ through a bolt $k'$ which extends loosely through a sleeve $k^2$ which in turn is passed through the frame $k$. This means of securing the frame $k$ at this point to the channel piece $l$ permits a relative movement between the frame and the piece during distortion or weaving of the chassis so that all binding between the worm $h^2$ and the worm gear $i$ is eliminated under all conditions. The sleeve $k^2$ permits initial adjustment of the frame $k$ on the chassis, the sleeve aligning itself and making it unnecessary to machine the frame elements accurately since they do not contact with one another.

The shaft $i'$ has keyed thereon a spur gear $m$ which drives the winch drum $n$ through an idler $m'$ and gear $n'$, the latter carried by the drum $n$. The idler $m'$ is feathered on a shaft $o$ and adapted to be slid thereon as a clutch element for engagement with the gears $m$, $n'$ for clutching or unclutching the drum $n$ from the drive shaft $i'$. Axial movement of the gear $m'$ may be effected through a hand lever $m^2$ connected through linkage $m^3$ to a collar $m^5$ on a shaft $m^6$ movable back and forth in bearings $m^7$; as shown in Fig. 1, shaft $m^6$ is to one side of the shaft $o$. The shaft $m^6$ is connected with a slidable yoke $m^4$ which engages the hub of the gear $m'$. A stop collar $m^8$ is adjustably clamped on the shaft $m^6$ for stopping its movement when the gears mesh $m'$ and $n'$ are in mesh. The gears $m$, $m'$ and $n'$ are of such relation as regards positioning or dimensions as to insure that the gear $m'$ when actuated for clutching the other two gears together shall engage said gears successively, that is to say, for instance, shall first engage the gear $m$, and a moment later, engage the gear $n'$. This may be accomplished by making the teeth of the gear $m$ somewhat wider than the teeth of the gear $m'$.

The drum $n$ can be held against rotation by means of a pawl $q$ which engages ratchet teeth $n^2$ carried with the drum $n$, the pawl $q$ being releasable, of course, when it is desired to have the drum rotate.

The drum $n$ can also be held against rotation by means of a brake band $r$ which cooperates with a brake drum $n^3$ carried with the drum $n$.

From the description given it will be evident that by manipulation of the variable-speed transmission $d'$ the power and speed ratios of the propeller shaft $b$ to the drum $n$ can be determined selectively according to the speed ratios allowed by the transmission $d'$. With the desired power or speed ratio determined the drum $n$ can be engaged operatively with the driving shaft $d^2$ of the transmission $d'$ by sliding the clutch gear $m'$ into engagement with the gears $m$, $n'$. Rotation of the counter-shaft $c'$ of the transmission $c$ will be controlled, in the preferred embodiments through the main vehicle clutch (not illustrated) as is usual. When a transmission having a reverse speed is employed at $d'$ it will be apparent that the reverse rotation of the drum $n$ will be controlled by the motor speed it being unnecessary thereupon to employ the brake $r$ to control the reverse rotation of the drum.

The entire structure gives the greatest of flexibility for power application to a winch or to supplemental nigger-heads such as $i^2$ and impresses on all of the transmission elements the least possible strain during the delivery of maximum power. The operation of the winch is readily controlled either positively through the engaged transmission elements, or through the pawl $q$, or by the brake $r$.

References will be had to the appended claims for statements of the scope of the invention.

We claim as our invention:

1. In a motor vehicle having a winding drum, in combination, an engine shaft extending rearwardly, a change-speed transmission for variation of the vehicle speeds driven from said shaft and having a housing, said transmission including a counter-shaft extending forwardly of the front end of the transmission housing, a second change-speed transmission disposed forward ly of the first mentioned transmission and having a drive shaft operatively connected with the forwardly extending counter-shaft, a power take-off shaft extending forwardly of said second mentioned transmission and supported in a bearing at its forward end, and means on the last named shaft intermediate its ends to transmit driving torque to the drum.

2. In combination with the chassis of a motor truck, a winch supported thereon, a drive shaft for the winch having a worm gear thereon, a worm meshed with the worm gear, a frame in which the worm and worm gear are journaled and a loose suspension for said frame on the chassis including a threaded sleeve passing through the frame and a bolt passing loosely through the sleeve, and engaging the chassis.

This specification signed this 3rd day of Aug. A. D. 1920.

ALFRED F. MASURY.
ROBERT S. BOLGER.